Dec. 6, 1955
T. K. DARROUGH
2,726,097
CONDITION RESPONSIVE DRAFT MEANS WITH RESILIENT STABILIZERS
Filed June 4, 1952
3 Sheets-Sheet 1
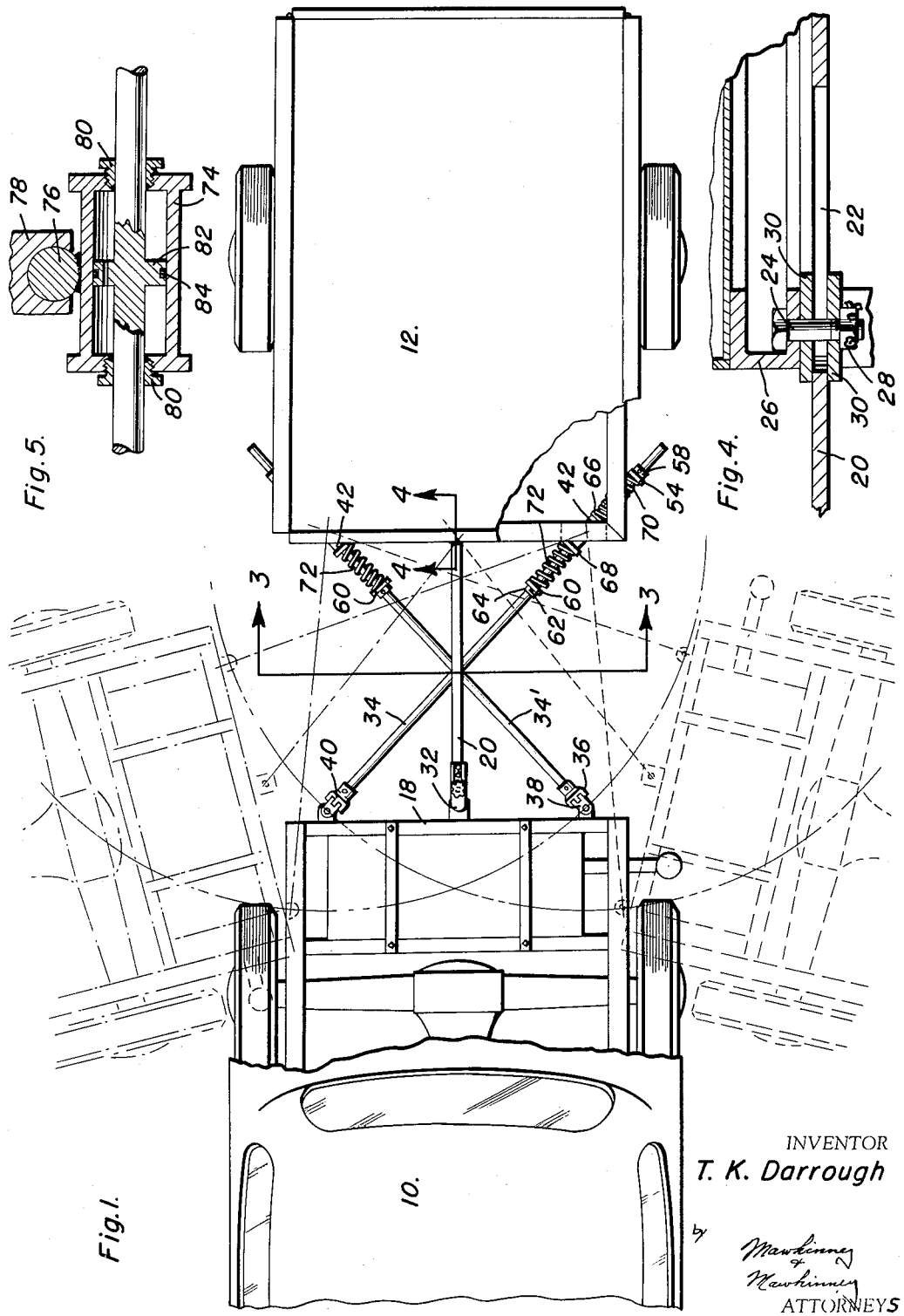
INVENTOR
T. K. Darrough
by Mawhinney & Mawhinney
ATTORNEYS

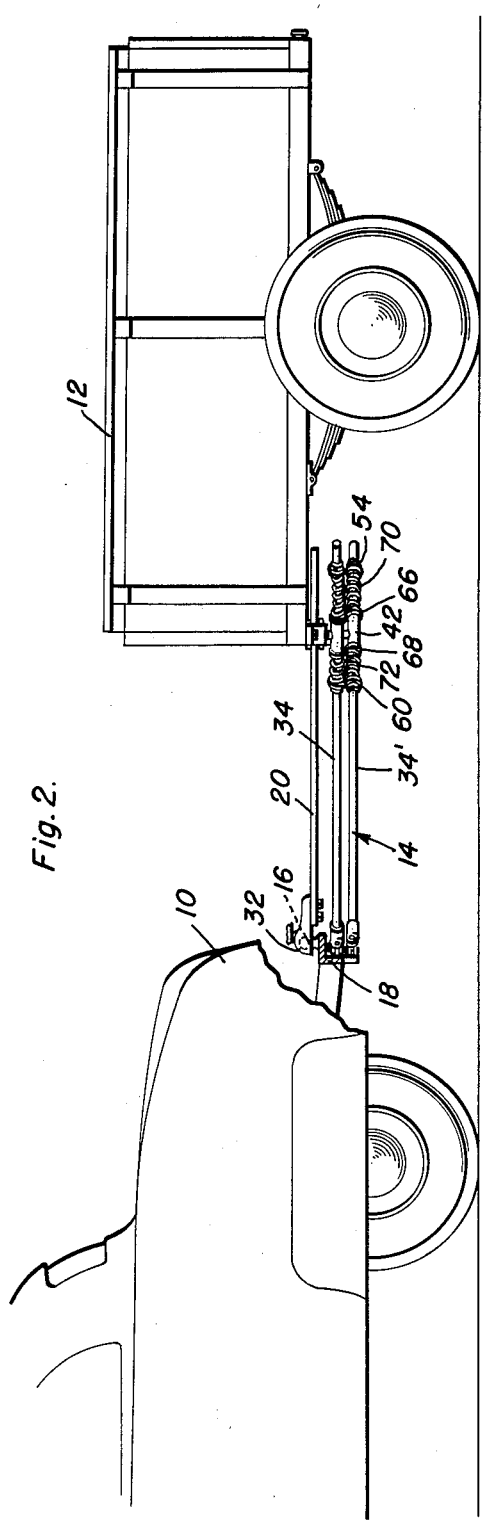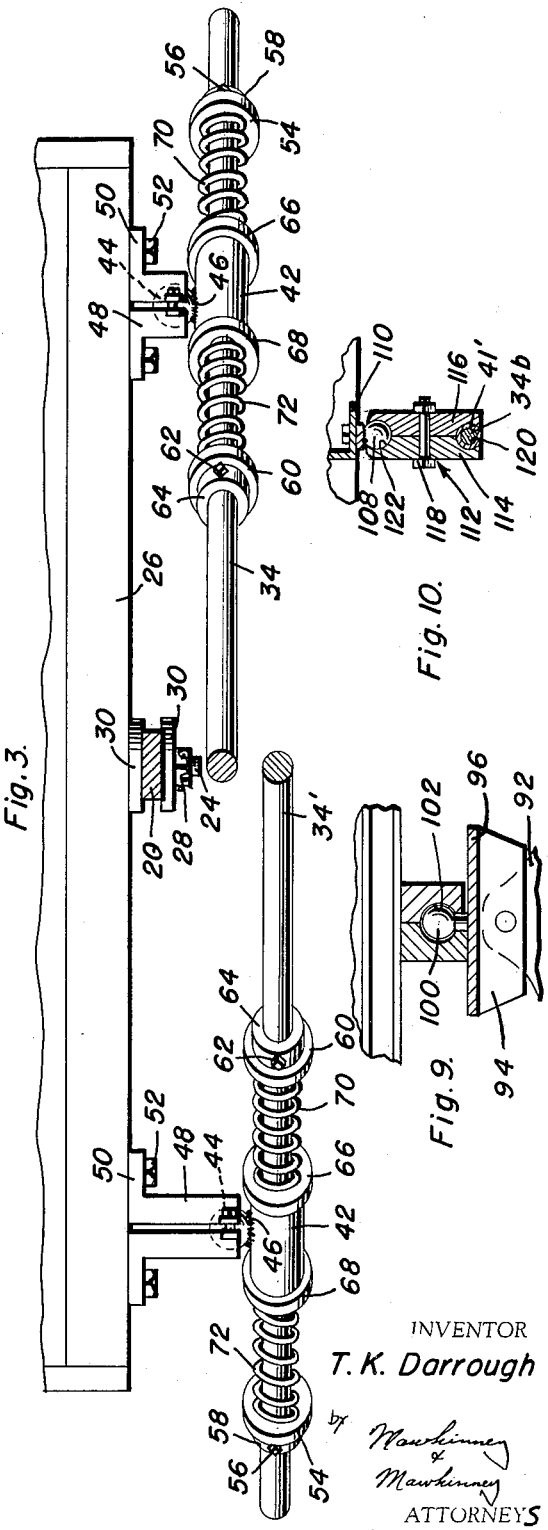

Dec. 6, 1955 — T. K. DARROUGH — 2,726,097
CONDITION RESPONSIVE DRAFT MEANS WITH RESILIENT STABILIZERS
Filed June 4, 1952 — 3 Sheets-Sheet 3
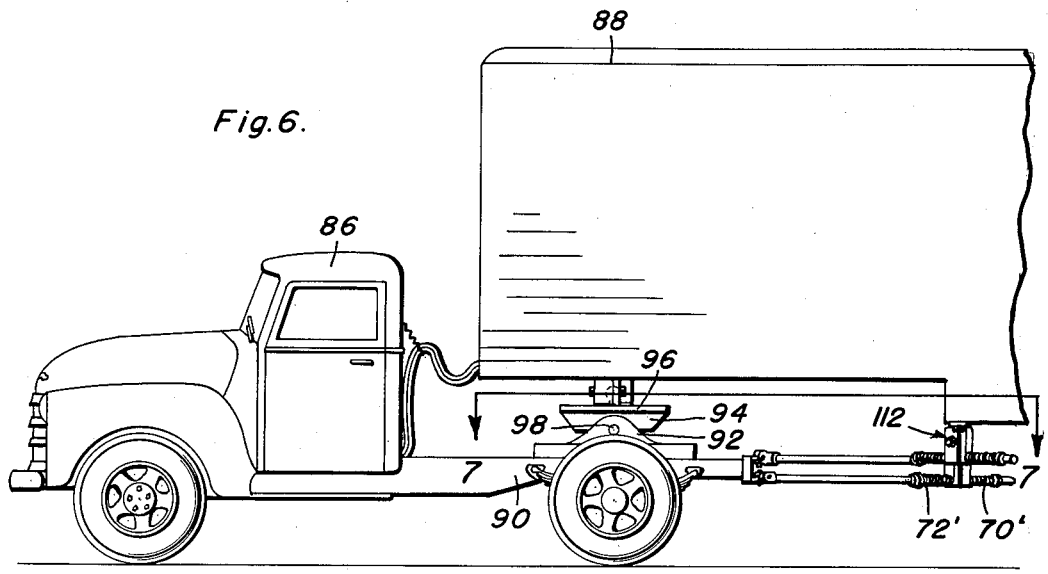
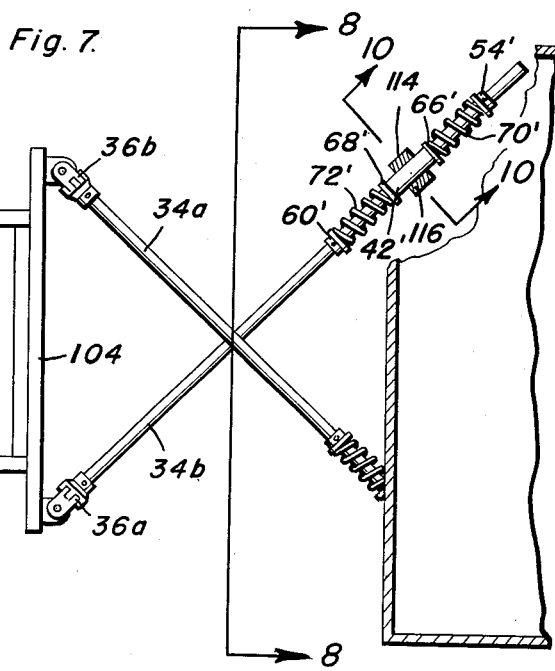
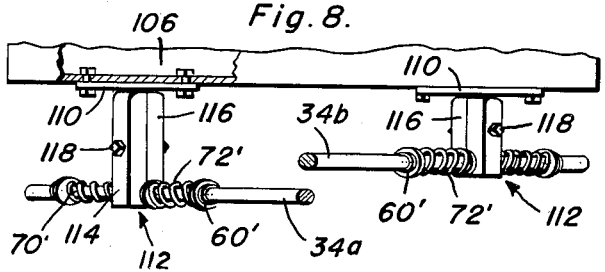
INVENTOR
T. K. Darrough
by Mawhinney & Mawhinney
ATTORNEYS

United States Patent Office 2,726,097
Patented Dec. 6, 1955

2,726,097

CONDITION RESPONSIVE DRAFT MEANS WITH RESILIENT STABILIZERS

Truman Kirkpatrick Darrough, Alexandria, Va.

Application June 4, 1952, Serial No. 291,638

4 Claims. (Cl. 280—446)

This invention relates to improvements in trailer hitches or devices for coupling a trailer to a towing or draft vehicle and has for its primary object to provide a trailer hitch which will prevent side sway of the trailer, which will enable the trailer to track around behind the towing vehicle, which will prevent "jack-knifing" of the trailer relative to the towing vehicle and which will prevent dragging of the wheels of the trailer during the execution of turns.

A further object of this invention is to provide a hitch device which will permit a trailer to be more easily controlled in a forward or reverse direction by providing a constant and continuous line of draft and to permit the trailer to turn in a short radius.

Another object of this invention is to provide a hitch device of the above kind which includes a pair of crossed hitch or draft rods that are universally connected to the towing vehicle at opposite sides of its rear end and universally and slidably connected to the front end of the trailer at its opposite sides.

Another object of this invention is to provide in association with the hitch or coupling rods a rest or support bar, which is mounted to the trailer for axial movement and projects forwardly thereof and which is universally mounted on the towing vehicle.

Another object of this invention is to provide a hitch device which can be easily detached from the towing vehicle and the trailer and which is inexpensive, compact and which will provide safety in transportation.

These and ancillary objects and structural features of merit are attained by this invention, preferred embodiments of which are set forth in the following description and illustrated in the accompanying drawings, wherein:

Figure 1 is a fragmentary top plan view of a towing vehicle and trailer illustrating the trailer coupled to the towing vehicle by means of a coupling or hitch device, constructed in accordance with this invention;

Figure 2 is a side elevational view thereof;

Figure 3 is a transverse structural view taken on line 3—3 of Figure 1 and looking in the direction of the arrows;

Figure 4 is an enlarged detailed structural view taken on line 4—4 of Figure 1;

Figure 5 is a longitudinal vertical structural view of another form of shock absorber for the coupling rods of the hitch device;

Figure 6 is a side elevational view of a tractor and trailer coupled by a modified form draft connection;

Figure 7 is a top plan view of the connection;

Figure 8 is a cross-sectional taken on line 8—8 of Fig. 7;

Figure 9 is a detailed sectional view taken on line 9—9 of Figure 7; and,

Figure 10 is a detailed sectional view taken on line 10—10 of Figure 7.

Referring now more particularly to the accompanying drawings, 10 designates a towing or draft vehicle which is coupled to the trailer 12 by a hitch or draft connection 14.

The draft connection 14 supplants the conventional center draft bar, which is carried by the trailer and centrally projects forwardly therefrom for attachment to a customary ball fitting on the bumper or rear end of a towing vehicle.

Instead of the customary draft or hitch bar, I provide a rest or support bar 20, which is formed at its rearward end with an axial slot 22. A bolt 24 is carried in depending fashion by the front frame bar 26 of the trailer 12, the bolt extending vertically through the slot 22 and attaching, by means of the nut 28, the rest bar 20 to the front frame bar 26. Spacers or washers 30 are carried by the bolt above and below the bar. A ball receiving socket 32 is attached to the front end of the rest bar 20, so that the bar 20 is universally joined or coupled by the customary ball fitting 16, to the rear end 18 of the frame of the towing vehicle. Of course, the ball fitting can be applied to a bracket or any other support, which is mounted on the rear end of a towing vehicle. The rest bar 20 merely serves to support the front end of the trailer frame and transfer the weight of the trailer to the rear end of the towing vehicle so that the trailer is held in level position. No draft or pull is transferred from the towing vehicle to the trailer through the bar 20.

The actual draft or pull is transmitted through a pair of crossed similar coupling or hitch rods 34. Each of the coupling or hitch rods 34 is pivotally connected as at 36 to the rear end of the towing vehicle. For example, each of the hitch or tow rods is provided at its front end with a double ended clevis member 38, such clevis member being fastened to the clevis end 40 on each rod by a pin. Thus, the front ends of the rod are universally connected to the rear end of the towing vehicle 10 by the connecting clevis.

The rods project diagonally from the rear end of the vehicle, the rod 34 and the companion rod 34' having their rear ends coupled in a universal, resilient and axially slidable manner to the front frame bar 26 of the trailer at the opposite sides of the latter. The rod 34, which overlies the rod 34', has its end connected to the opposite side of the trailer from its front end connection as does the underlying rod 34'.

As seen more particularly in Figures 2 and 3, the rear end of each of the rods slides in a sleeve 42, which has an upstanding ball 44 welded thereto as at 46. A split socket 48 receives the ball 44 and is fixed to the underside of the front frame bar 26 by means of a mounting flange 50 and bolts 52. An adjustable stop or abutment 54 is concentrically disposed on each rod rearwardly of the sleeve 42 and is held in adjusted positions by a set screw 56 which radially projects through the collar 58 on the abutment to bear against the rod. A similar stop or abutment 60 is circumposed on each rod forwardly of the sleeve 32 and is held in adjusted positions by a set screw 62 that radially projects through a collar 64 and bears against the rod. The sleeve 42 is formed at its opposite ends with fixed stops or abutments 66 and 68 which are opposed to the movable or adjustable stops or abutments 54 and 60. Compression springs 70 and 72 are positioned on each rod, the spring 70 bearing at one end against the fixed abutment 66 and at its other end against the adjustable abutment 54 and the spring 72 bearing at one end against the adjustable abutment 60.

It can thus be seen that as either the rod 34 or 34' slides rearwardly through its associated sleeve 42, the spring 72 will be further compressed and the jar will be absorbed by the spring. Similarly, when either of the rods slides forwardly in its sleeve 42, the spring 70 will be further compressed and will yieldingly absorb the jar.

Thus, each of the rods is connected to the trailer in a fashion so that the shock and strain incident to sudden starting, drafting or jarring is absorbed and the effects of the jarring and starting are not imparted to the hitch device or the coupled vehicles.

Another form of shock absorber for the rods is illustrated in Figure 5, wherein a cylinder 74 is provided instead of the sleeve 42, the cylinder having a ball 76 on its upper side. The ball mates with a split socket 78 depending from the frame bar 26. The rod 34 extends slidably and sealingly through the fitting 80 in the ends of the cylinder and is provided with a piston 82. The piston 82 is fixedly circumposed on the rod within the cylinder 74 and is formed with peripheral relief slots 84. Thus, the piston is loosely fitted in the cylinder, which is partly filled with hydraulic fluid, and cushions the shock or jar of the movement of the rod in a dashpot manner.

It will be noted that the crossed tow or hitch rods 34 and 34' are connected to the front frame bar 26 of the trailer and to the frame of the towing vehicle so that they are articulated with the frame members of both the towing vehicle 10 and trailer 12.

Under normal straight draft conditions, the load of the trailer will partially compress the springs 70, the pull being transmitted entirely through the tow or hitch rods 34 and 34' from the frame of the towing vehicle to the frame of the trailer. When the vehicles pass over rough terrain, the rods are free to move at both ends, due to the universal couplings at each end, one directly to the frame of the towing vehicle and the other through the supporting universally mounted sleeves 42.

When the towing vehicle turns in either direction, as illustrated in dotted lines in Figure 1, the tow rod on the side remote from the direction of turn will be pulled forward in its sleeve, the spring 72 on the rod being further compressed, while the tow rod close to direction of turn, will be moved rearwardly in its sleeve, such rod relieving the compression on its spring 70 and partially compressing its spring 72. During the execution of such turn, the front wheels of the trailer will track around with the rear wheels of the towing vehicle and the trailer will turn in a short radius.

In the embodiment of the invention shown in Figures 6–10, the numeral 86 designates a tractor to which is coupled a trailer 88. The bed 90 of the tractor supports the front end of the trailer through a universal connection, illustrated in detail in Figure 9. Upstanding from the bed 90 is a pair of spaced supporting plates 92 between which the flange 94 on a plate 96 is pivoted by pin 98. The plate 96 has an upstanding ball 100 provided on its upper surface, the ball being received in a split socket 102 that depends from the under side of the trailer. It will be noted that the ball and socket unit 100 and 102 is not a regular tight fit but instead the socket is formed with a greater diameter than the ball. There is no draft through the ball and socket 100 and 102, such connection being merely a rest or support for the trailer.

The draft is through the crossed hitch or coupling rods 34ª and 34ᵇ, which are universally connected at their forward ends to a cross bar 104 carried by the frame of the tractor. The universal connections 36ª and 36ᵇ for the rods 34ª and 34ᵇ are similar to the universal connection 36 for the rods 34 and 34' in Figure 1.

Secured to the frame 106 of the trailer 88 and depending therefrom at opposite sides of the front end of the frame are balls 108. The balls are detachably secured to the frame by mounting flanges 110.

The sleeves 42' are constructed similar to the sleeve 42 and have fixed stops or abutments 66' and 68' formed on their opposing ends. The sleeves are mounted in blocks 112, each block, as seen in Figure 10, including complementary sections 114 and 116 which are secured together by bolts 118. An opening 120 is formed through the block by the mating recesses in the adjoining faces of the sections to receive the sleeve 42' and the ends of the block abut the stops 66' and 68', as seen in Figure 7. A socket 122 is formed in the upper end of the block and defined by the complemental recesses in the upper ends of the sections.

Abutments 54' and 60' are adjustably secured to the rods and compression springs 70' and 72' are coiled on the rods and have their ends abutting the fixed stops 66' and 68' on the sleeve and the adjustable stops or abutments 54' and 60'.

To connect the coupling rods 34ª and 34ᵇ to the tractor frame, the sections 114 and 116 of each of the blocks 112 are spread apart to receive the sleeve 42' within the opening 120 and to position the socket 122 on the ball 108.

In use, the draft or pull is transmitted across the hitch or coupling rods 34ª and 34ᵇ from the tractor frame to the frame of the trailer similar to the operation of the hitch rods 34 and 34'.

Although I have disclosed herein the best forms of the invention known to me at this time, I reserve the right to all such modifications and changes as may come within the scope of the following claims.

Having described the invention, what is claimed as new is:

1. A hitch device for coupling a trailer to a towing vehicle comprising a rest bar, a universal joint adapted to connect the forward end of the bar to the vehicle, means adapted to connect the rear end of the bar to the trailer for relative swivelling of the bar and the trailer and for axial movement of the bar with respect to the trailer comprising a pivot element adapted to be carried by the trailer and said bar having an axially extending slot therein for receiving said pivot element for guiding the bar in its axial movements, a pair of crossed draft rods, means adapted to universally connect the front end of each rod to one side of the rear end of a vehicle, said rods being adapted to be crossed and extend longitudinally, sleeves slidably receiving the rear end portion of the rods, means adapted to universally connect the sleeves to the trailer frame, and shock absorbing means carried by the rods forwardly and rearwardly of the sleeves.

2. A hitch device for coupling a trailer to a towing vehicle comprising a rest bar, a universal joint adapted to connect the forward end of the bar to the vehicle, means adapted to connect the rear end of the bar to the trailer for relative swivelling of the bar and the trailer and for axial movement of the bar with respect to the trailer comprising a pivot element adapted to be carried by the trailer and said bar having an axially extending slot therein for receiving said pivot element for guiding the bar in its axial movements, a pair of crossed draft rods, means adapted to universally connect the front end of each rod to one side of the rear end of a vehicle, said rods being adapted to be crossed and extend longitudinally, sleeves slidably receiving the rear end portion of the rods, means adapted to universally connect the sleeves to the trailer frame, and shock absorbing means carried by the rods forwardly and rearwardly of the sleeves, said last means including abutments on the rods forwardly and rearwardly of the sleeves, said abutments being movable axially of the rods, means locking said abutments in adjusted positions and springs on the rods rearwardly and forwardly of the sleeves and bearing against the sleeves and the abutments.

3. In a trailer hitch, a pair of similar crossed draft members extending diagonally from opposite sides of the rear end of a towing vehicle and the front end of a trailer, each of said members comprising one continuous rod, means for slidably receiving each of said rods, means for universally mounting said rod receiving means on the trailer, cushioning means carried by each rod and its receiving means for limiting the forward and rearward movement of the rods in said rod receiving means and for absorbing the shocks incident thereto, a rest bar, means for connecting one end of the bar to the vehicle for universal movement with respect thereto, said bar having a longitudinally extending slot in its other end portion, and a pivot element adapted to be carried by the trailer and to ride in the slot to permit relative swivelling of the bar and trailer and axial movement of the bar with respect to the trailer.

4. In combination with a towing vehicle and a trailer vehicle, a rest bar extending between said vehicles and universally coupled to one of said vehicles, cooperating means on said rest bar and the other of said vehicles for connecting said vehicles in level position and permitting relative movement of said vehicles axially of the rest bar without transmitting any draft action from one vehicle to the other vehicle comprising an axially extending guideway in the bar and a swivel element on the said other vehicle for riding in said guideway in the bar, and a hitch device comprising a pair of similar crossed longitudinally extending draft rods, each rod being universally connected at its forward end to one side of the rear end of the towing vehicle, sleeves universally mounted on the front end of the frame of the trailer at its opposite sides and each slidably receiving a rod, adjustable abutments on each rod forwardly and rearwardly of the sleeves, and compression springs coiled on the rods and confined between the abutments and sleeves so that only one compression spring on each rod is compressed by the forward movement of the rods and only the other spring on each rod is compressed by the rearward movement of the rods.

References Cited in the file of this patent

UNITED STATES PATENTS

| | | |
|---|---|---|
| 606,105 | Van Dorn | June 21, 1898 |
| 2,057,658 | Bryant | Oct. 20, 1936 |
| 2,202,658 | Howley | May 28, 1940 |
| 2,225,130 | Otto et al. | Dec. 17, 1940 |
| 2,378,297 | Hetzler | June 12, 1945 |
| 2,493,874 | Hume | Jan. 10, 1950 |
| 2,521,132 | Smith | Sept. 5, 1950 |

FOREIGN PATENTS

| | | |
|---|---|---|
| 363,084 | France | July 20, 1906 |
| 575,609 | France | Aug. 2, 1924 |
| 623,114 | France | June 16, 1927 |
| 788,790 | France | Oct. 16, 1935 |
| 19,782 | Great Britain | Apr. 4, 1912 |
| 147,125 | Great Britain | Aug. 4, 1921 |
| 603,509 | Great Britain | June 17, 1948 |